United States Patent
Hayakawa et al.

(10) Patent No.: US 9,509,491 B2
(45) Date of Patent: Nov. 29, 2016

(54) DATA RECEPTION APPARATUS AND METHOD OF DETERMINING IDENTICAL-VALUE BIT LENGTH IN RECEIVED BIT STRING

(71) Applicant: DENSO CORPORATION, Kariya, Aichi-pref. (JP)

(72) Inventors: Keita Hayakawa, Toyota (JP); Hironobu Akita, Okazaki (JP); Hirofumi Yamamoto, Obu (JP)

(73) Assignee: DENSO CORPORATION, Kariya (JP)

( * ) Notice: Subject to any disclaimer, the term of this patent is extended or adjusted under 35 U.S.C. 154(b) by 192 days.

(21) Appl. No.: 14/325,745

(22) Filed: Jul. 8, 2014

(65) Prior Publication Data

US 2015/0019898 A1    Jan. 15, 2015

(30) Foreign Application Priority Data

Jul. 11, 2013 (JP) ................................. 2013-145427

(51) Int. Cl.
| | | |
|---|---|---|
| *G06F 1/12* | (2006.01) | |
| *H04L 7/033* | (2006.01) | |
| *H04L 7/00* | (2006.01) | |

(52) U.S. Cl.
CPC ........... *H04L 7/0332* (2013.01); *H04L 7/0087* (2013.01)

(58) Field of Classification Search
CPC . H04L 7/0332; H04L 7/0087; H04L 25/068; H04L 25/069
See application file for complete search history.

(56) References Cited

U.S. PATENT DOCUMENTS

| 7,136,443 B2 * | 11/2006 | Vallet et al. .......... H04L 7/0338 370/516 |
|---|---|---|
| 2002/0196883 A1 | 12/2002 | Best et al. |
| 2004/0117691 A1 * | 6/2004 | Fang ..................... H04L 7/0338 714/699 |
| 2005/0135527 A1 | 6/2005 | Masui et al. |
| 2005/0213696 A1 | 9/2005 | Totsuka et al. |
| 2012/0020399 A1 | 1/2012 | Doi |

FOREIGN PATENT DOCUMENTS

WO    2014/010236 A1    1/2014

OTHER PUBLICATIONS

U.S. Appl. No. 14/537,969, filed Nov. 11, 2014, Akita et al.
PCI Express Architecture, PCI Express Jitter and BER, Revision 1.0, Feb. 11, 2005 (discussed on p. 1 of the specification; also see p. 9 lines 2 to 5 and lines 10 to 11 of the literature).
Serial ATA: High Speed Serialized AT Attachment, Revision 1.0a, Jan. 7, 2003 (discussed on p. 1 of the specification; also see p. 78 of the literature).

(Continued)

*Primary Examiner* — Sophia Vlahos
(74) *Attorney, Agent, or Firm* — Posz Law Group, PLC

(57) ABSTRACT

A data reception apparatus calculates an integrated number of bits by integrating the number of bits in a received bit string; calculates an integrated number of samples by integrating the number of samples obtained by oversampling each bit; obtains a fitting line indicating correspondence between the integrated number of bits and the integrated number of samples based on a plurality of points of which each point corresponds to either only a rise edge or only a fall edge of each bit in the received bit string; and determines a bit length in the received bit string based on the fitting line.

19 Claims, 15 Drawing Sheets

(56) References Cited

OTHER PUBLICATIONS

Universal Serial Bus Specification, Revision 2.0, Apr. 27, 2000 (discussed on p. 1 of the specification; also see p. 37 line 4 from the bottom of the literature).
Richard C. Walker, Designing Bang-Bang PLLs for Clock and Data Recovery in Serial Data Transmission Systems (discussed on p. 1 of the specification; also see Fig. 13 in p. 6 of the literature).
J. Kim et al, Multi-Gigabit-Rate Clock and Data Recovery Based on Blind Oversampling, IEEE Communications Magazine, Dec. 2003, p. 68-74 (discussed on p. 1 of the specification; also refer to Figure 4).
High-Speed Inter-Chip USB Electrical Specification, Version 1.0, Sep. 23, 2007.
Inter-Chip USB Supplement to the USB 2.0 Specification, Revision 1.0, Mar. 13, 2006.
Explanation for Non-patent Literatures 1 to 5.

* cited by examiner

| | BIT LENGTH | 1 | 1 | 1 | 1 | 1 | 1 | 1 |
|---|---|---|---|---|---|---|---|---|
| A | NUMBER OF SAMPLES (NO DEGRADATION FACTOR) | 8 | 8 | 8 | 8 | 8 | 8 | 8 |
| B | NUMBER OF SAMPLES (FREQUENCY ERROR) | 6 | 6 | 6 | 6 | 6 | 6 | 6 |
| C | NUMBER OF SAMPLES (PERIODIC JITTER) | 6 | 7 | 8 | 9 | 10 | 9 | 8 |
| D | NUMBER OF SAMPLES (RANDOM JITTER) | 6 | 8 | 10 | 9 | 8 | 7 | 10 |
| E | NUMBER OF SAMPLES (ALL DEGRADATION FACTORS AVERAGED) | 6 | 7 | 8 | 8 | 8 | 7.333 | 8 |
| F | NUMBER OF SAMPLES (DISCRETIZED BY OVERSAMPLING) | 6 | 7 | 8 | 8 | 8 | 7 | 8 |

— NONE
------ FREQUENCY ERROR
—·—·— PERIODIC JITTER
·······— RANDOM JITTER

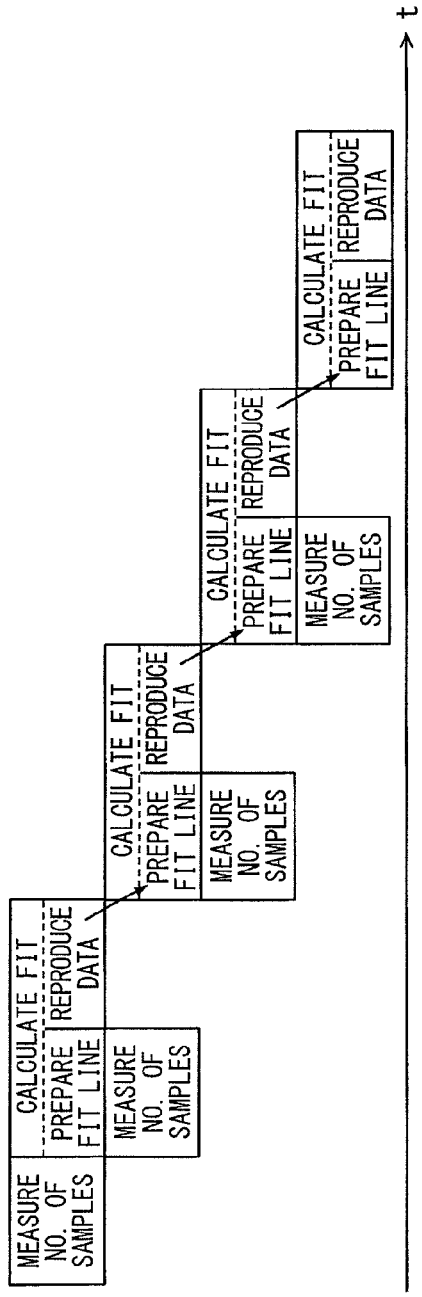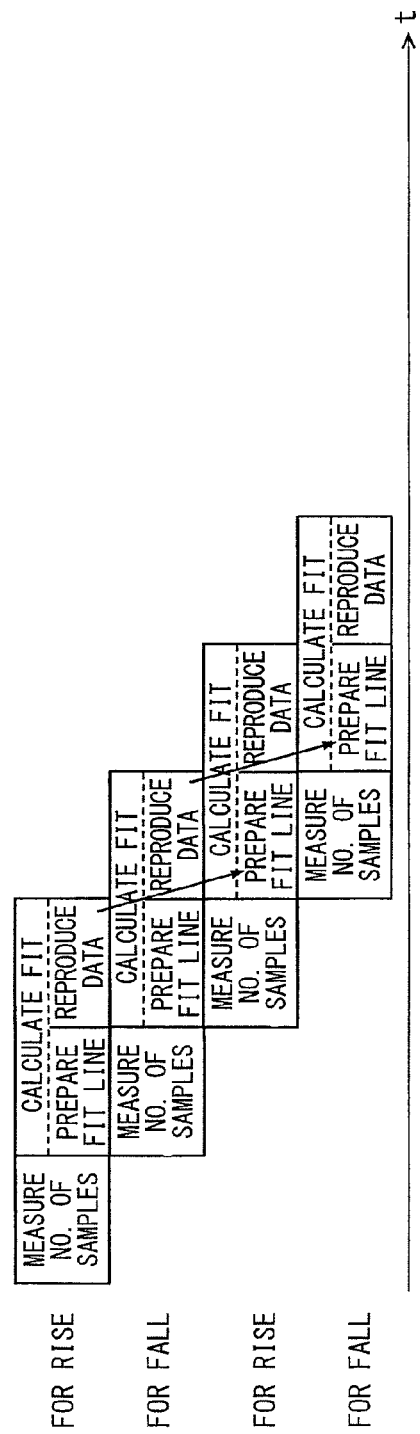

FIG. 15
STEP 1 : FIND "M" FROM RISE EDGES
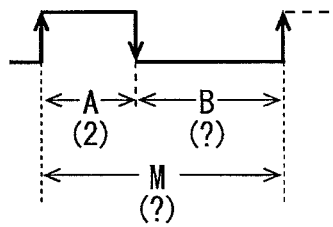
STEP 2 : CALCULATE "B"
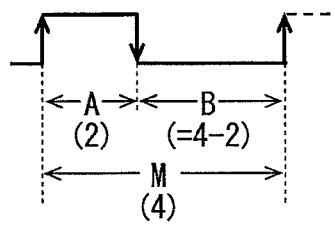
STEP 3 : FIND "N" FROM FALL EDGES
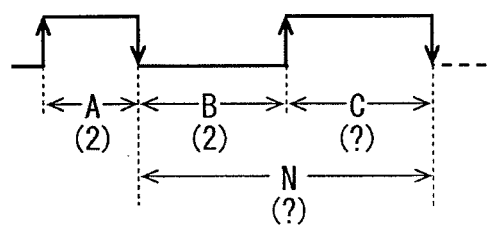
STEP 4 : CALCULATE "C"
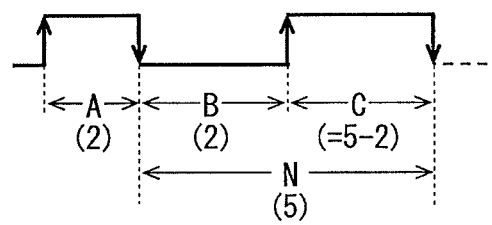

DATA RECEPTION APPARATUS AND METHOD OF DETERMINING IDENTICAL-VALUE BIT LENGTH IN RECEIVED BIT STRING

CROSS REFERENCE TO RELATED APPLICATION

The present application is based on Japanese Patent Application No. 2013-145427 filed on Jul. 11, 2013, the disclosure of which is incorporated herein by reference.

TECHNICAL FIELD

The present disclosure relates to a data reception apparatus that oversamples a received bit string from a data transmission apparatus to determine an identical-value bit length in the received bit string, further relating to a method of determining the identical-value bit length.

BACKGROUND ART

[Patent Literature 1] JP 2005-192192 A
[Patent Literature 2] JP 2014-033428 A (WO 2014/010236 A1)
[Nonpatent Literature 1] PCI Express Architecture PCI Express Jitter and BER Revision 1.0, 11 Feb. 2005
[Nonpatent Literature 2] Serial ATA: High Speed Serialized AT Attachment Revision 1.0a, 7 Jan. 2003
[Nonpatent Literature 3] Universal Serial Bus Specification Revision 2.027 Apr. 2000
[Nonpatent Literature 4] Designing Bang-Bang PLLs for Clock and Data Recovery in Serial Data Transmission Systems Richard C. Walker, 2003
[Nonpatent Literature 5] Multi-Gigabit-Rate Clock and Data Recovery Based on Blind Oversampling, J. Kim, IEEE Communications Magazine, December 2003, p. 68-74

A technology of clock data recovery (CDR) in data communications is required to provide a short lock time when the data are intermittently transmitted (when starts and stops of transmission are repeated). For example, PCI Express adopts CDR with phase interpolator, in order to realize a short lock time (refer to Nonpatent Literature 1). In the CDR with phase interpolator, a receiver generates a plurality of clocks having different phases and selects one of the clocks that has a phase closest to that of the received data. This CDR with phase interpolator has a function to select a clock but no function to adjust a clock frequency. This requires a clock frequency error (offset) to be small between a clock source (i.e., an oscillation source) of a data transmission side and a clock source of a data reception side. For instance, Nonpatent Literature 1 uses an identical clock source in both the data transmission side and the data reception side so as not to produce a clock frequency error.

Moreover, Serial ATA requires a clock source in a data reception side to have a clock frequency error of ±350 [ppm] whereas requiring a clock source in a data transmission side to have a clock frequency error similar to that of the data reception side. Thereby, the clock frequency error can be small between the clock sources in the data transmission side and the data reception side, so that a short lock time is achieved (refer to Nonpatent Literature 2).

Furthermore, USB specifies that a synchronous pattern having a small bit length is used to lock on the premise that the clock frequency error is small enough in between the clock sources of the data transmission side and the data reception side. To be specific, in Nonpatent Literature 3, the dock frequency error needs to be 0.25% (=0.21 [nsec]/($\frac{1}{12}$ [Mbps]).

Further, the transmission of video signals uses data communications that transmit data continuously. In such communications, data can be transmitted continuously once the lock is fulfilled. Thus, even if a lock time is long, CDR with phase synchronization is adopted (refer to Nonpatent Literature 4). Suppose that the phase comparison needs 500 cycles, for instance. The phase comparison requires the change points of bits while the presence probability of the change points of bits is about 50%. The lock thus needs about 1000 bits. In particular, the clock frequency error as well as the phase error arises at the time when the power is turned on. The lock further needs additional bits so that the necessary number of bits becomes 10,000 bits, for instance. This requires the lock time in CDR with phase synchronization to be shorter as much as possible. For instance, another technology is disclosed which oversamples a bit string of data and conducts signal processing with a digital circuit (refer to Nonpatent Literature 5 and Patent Literature 1).

The Inventors found the following. As indicated in Nonpatent Literatures 1, 2, and 3, the CDR with phase interpolator is supposed to use clock sources each having a small clock frequency error between a data transmission side and a data reception side for realizing a short lock time. However, a CR oscillation circuit, which functions as a clock source built in LSI (Large Scale Integration), generally provides a clock frequency error of about 10%. Thus, another clock source such as a crystal oscillator having a small frequency error needs to be provided as an independent body to be separate from an LSI.

Further, as indicated in Nonpatent Literature 4, the CDR with phase synchronization needs a long lock time that is unsuitable for data communications. Furthermore, oversampling each bit of data and subsequent digital processing can shorten a lock time to some extent; however, the effect may be limited. That is, Nonpatent Literature 5 and Patent Literature 1 provide only a technique to use a digital circuit for achieving a feedback loop of PLL (Phase-Locked Loop) realized in an analog circuit; thus, the technique finds a difficulty in shortening a lock time significantly. To be specific, in Nonpatent Literature 5, the number of loop filters for feedback is 512 or more, and the lock time thus needs the number of bits of multiples of 512. Moreover, Patent Literature 1 supposes a clock frequency error of about 1000 [ppm] on the premise that a clock frequency can be estimated when the phase is determined.

To that end, the Applicant filed Patent Literature 2 disclosing a data reproduction method by determining an identical-value bit length of a received bit string even with a configuration permitting a data receive-side clock source to have a degree of clock frequency error or difference from that of a data transmit-side clock source. That is, the method calculates an integrated number of bits by integrating the predetermined number of bits in a received bit string, and calculates an integrated number of samples by integrating the number of samples corresponding to each bit of the predetermined number of bits in oversampling data. The method further obtains a fitting line (i.e., approximated line) based on a plurality of points each of which indicates correspondence between the integrated number of bits and the integrated number of samples, and determines an identical-value bit length corresponding to a segment in which identical values continue after the integrated number of samples in the oversampling data based on the fitting line.

Further, the Inventors found the following. That is, there may be a case where a duty cycle of each bit in a received bit string deviates significantly. Such a case causes the above method to find a difficulty in obtaining a fitting line accurately and determining an identical-value bit length in the received bit string.

SUMMARY

It is an object of the present disclosure to provide a data reception apparatus and a method of determining an identical-value bit length in a received bit string even when a duty cycle of each bit deviates in the received bit string under a configuration permitting a data receive-side clock source to have a degree of difference in clock frequency from that of a data transmit-side clock source.

To achieve the above object, according to an example of the present disclosure, a data reception apparatus is provided to include a receive-side clock source, an oversampling data generation device, a bit integrated number calculation section, a sample integrated number calculation section, and a bit length determination section. The receive-side clock source is provided to be separate from a transmit-side clock source of a data transmission apparatus that transmits data; the receive-side clock source generates a receive clock to output. The oversampling data generation device generates oversampling data by oversampling each bit of a received bit string that is received from the data transmission apparatus in synchronization with the receive clock inputted from the receive-side clock source. The bit integrated number calculation section calculates an integrated number of bits by integrating a predetermined number of bits in the received bit string. The sample integrated number calculation section calculates an integrated number of samples by integrating the number of samples corresponding to each bit of the integrated predetermined number of bits in the oversampling data generated by the oversampling data generation device. The bit length determination section obtains an approximated line based on a plurality of points each of which indicates correspondence between the integrated number of bits and the integrated number of samples, and determines an identical-value bit length in the oversampling data based on the approximated line, the identical-value bit length being a bit length in an identical-value bit string corresponding to a segment in which identical values continue after the integrated number of samples calculated by the sample integrated number calculation section. Further, the bit length determination section obtains the approximated line based on the plurality of points each of which corresponds to at least either only a rise edge of each bit or only a fall edge of each bit in the received bit string.

The above configuration can provide the following advantageous effects even when the receive-side clock source has a degree of clock frequency error compared with a transmit-side clock source. That is, an approximated line (i.e., fitting line) is obtained based on a plurality of points each of which indicates correspondence between the integrated number of bits and the integrated number of samples; obtaining the approximated line results in obtaining accurately the number of samples per bit of a bit string with an accuracy higher than the oversampling period (inverse of the number of samples). Once the number of samples per bit of a bit string is obtained, the number of samples per bit is then used as a divisor to divide the number of data of a segment where identical values continue in the oversampling data; thereby, an identical-value bit length corresponding to the segment can be determined. In such case, an approximated line is obtained based on a plurality of points of which each point corresponds to either only a rise edge or only a fall edge of each bit in the received bit string. This enables an accurate determination of an identical-value bit length in a received bit string even when a duty cycle may deviate in each bit of the received bit string.

BRIEF DESCRIPTION OF THE DRAWINGS

The above and other objects, features, and advantages of the present disclosure will become more apparent from the following detailed description made with reference to the accompanying drawings. In the drawings:

FIG. 10A is a diagram illustrating a series of processing in a comparative example;

FIG. 10B is a diagram illustrating a series of processing according to the present embodiment;

FIG. 15 is a diagram illustrating a recursive process; and

DETAILED DESCRIPTION

Figure 1:
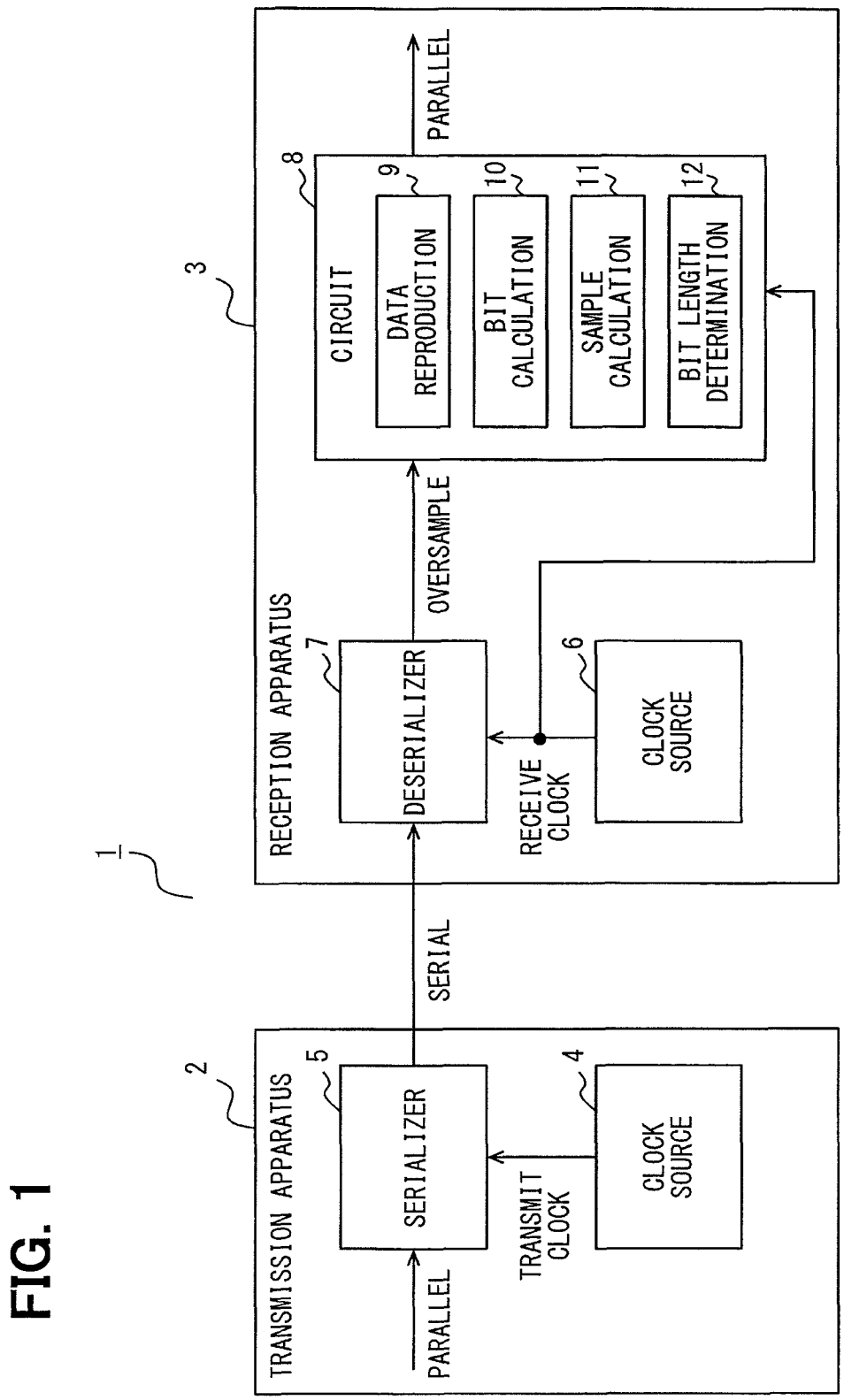
FIG. 1 is a functional block diagram according to an embodiment of the present disclosure.

An embodiment according to the present disclosure will be explained with reference to drawings. The data communications explained in the present embodiment are applied to communications between LSIs (Large Scale Integration) in a single ECU (Electronic Control Unit) mounted in a vehicle, or communications between LSIs in different ECUs mounted in a vehicle, for instance. A data communication system 1 communicates between LSIs and includes a data transmission apparatus 2 that transmits data and a data reception apparatus 3 that receives data.

The data transmission apparatus 2 includes a transmit-side clock source 4 and a serializer 5. The transmit-side clock source 4 includes a CR oscillation circuit to generate a transmit clock, and outputs it to the serializer 5. The serializer 5 first receives parallel data that is to be transmitted to the data reception apparatus 3, and then synchronizes the received parallel data with the transmit clock inputted from the transmit-side clock source 4 for parallel-serial conversion to generate serial data. The serializer 5 transmits the generated serial data to the data reception apparatus 3 via a communication line.

The data reception apparatus 3 includes a receive-side clock source 6, a deserializer 7 (equivalent to an oversampling data generation device or means), and a data reproduction circuit 8. The receive-side clock source 6 includes a CR oscillation circuit, like the transmit-side clock source 4, to generate a receive clock, and outputs it to the deserializer 7 and the data reproduction circuit 8. The deserializer 7 conducts the following first step: receiving the serial data via the communication line from the data transmission apparatus 2; then oversampling a bit string of the received serial data in synchronization with the receive clock inputted from the receive-side clock source 6 to generate oversampling data; and outputting the generated oversampling data to the data reproduction circuit 8. If the present data communications belong to general ones, the deserializer 7 uses desirably multiples of 5 to 10 for oversampling each bit; a multiple is the number of samples per bit (also referred to as a sample count per bit). In FIG. 1, the receive-side clock source 6 outputs the receive clock directly to deserializer 7 and the data reproduction circuit 8. Without need to be limited thereto, the receive-side clock source 6 may output the receive clock via a PLL (Phase-Locked Loop) circuit etc. Moreover, in order to compensate the clock delay in the deserializer 7, a receive clock may be first inputted to the deserializer 7; namely, after passing through the deserializer 7, a receive clock may be inputted to the data reproduction circuit 8.

The data reproduction circuit 8 includes a data reproduction section 9 (equivalent to a data reproduction device or means), a bit integrated number calculation section 10 (equivalent to a bit integrated number calculation device or means), a sample integrated number calculation section 11 (equivalent to a sample integrated number calculation device or means), and a bit length determination section 12 (equivalent to a bit length determination device or means). The data reproduction section 9 first receives oversampling data from the deserializer 7 and then synchronizes the received sampling data with the receive clock inputted from the receive-side clock source 6 to conduct serial-parallel conversion and generate parallel data, which are identical to or shifted from the parallel data which the serializer 5 of the data transmission apparatus 2 receives.

The present embodiment explains an example configuration where each of the transmit-side clock source 4 and the receive-side clock source 6 is built in an LSI. Without need to be limited thereto, the clock sources 4, 6 may be provided as independent bodies to be separate from LSIs (provided outside of LSI). When being provided as an independent body, the clock source may include a crystal oscillator that provides a higher accuracy than a CR oscillation circuit. Moreover, the frequency of the transmit clock outputted from the transmit-side clock source 4 and the frequency of the receive clock outputted from the receive-side clock source 6 need not be identical to each other or integral multiples of each other. The frequency of the receive clock only needs to be a frequency that permits the deserializer 7 to oversample one bit.

Figure 2:
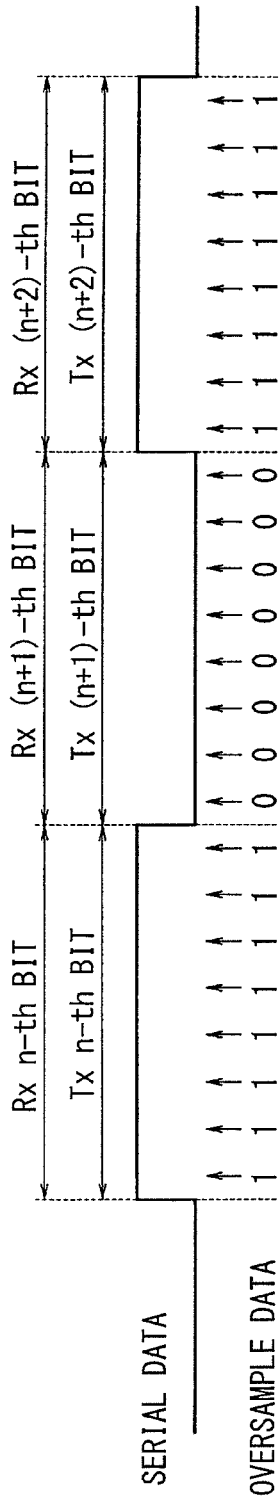
FIGS. 2A and 2B are diagrams illustrating examples of oversampling data.

The following explains operations in the present embodiment with reference to FIGS. 2A to 14. The frequency of the transmit clock outputted from the transmit-side clock source 4 and the frequency of the receive clock outputted from the receive-side clock source 6 will be explained first. When any frequency error (offset) does not occur between both sides, a 1-bit segment of a bit string of the receive-side and a 1-bit segment of a bit string of the transmission side accord with each other without deviated. That is, as indicated in FIG. 2A, when one bit is oversampled with eight samples (8 times), the 1-bit segment of the transmission side corresponds to oversampling data of eight samples of the reception side. In contrast, when a frequency error (offset) occurs between both sides, a 1-bit segment of a bit string of the reception side and a 1-bit segment of a bit string of the transmission side may be deviated from each other and not accord with each other. That is, with reference to FIG. 2B, when one bit is oversampled with eight samples (8 times) like in FIG. 2A, the 1-bit segment of the transmission side may be deviated to oversampling data of seven bits without corresponding to oversampling data of eight samples of the reception side, for instance.

Figures 3, 4:
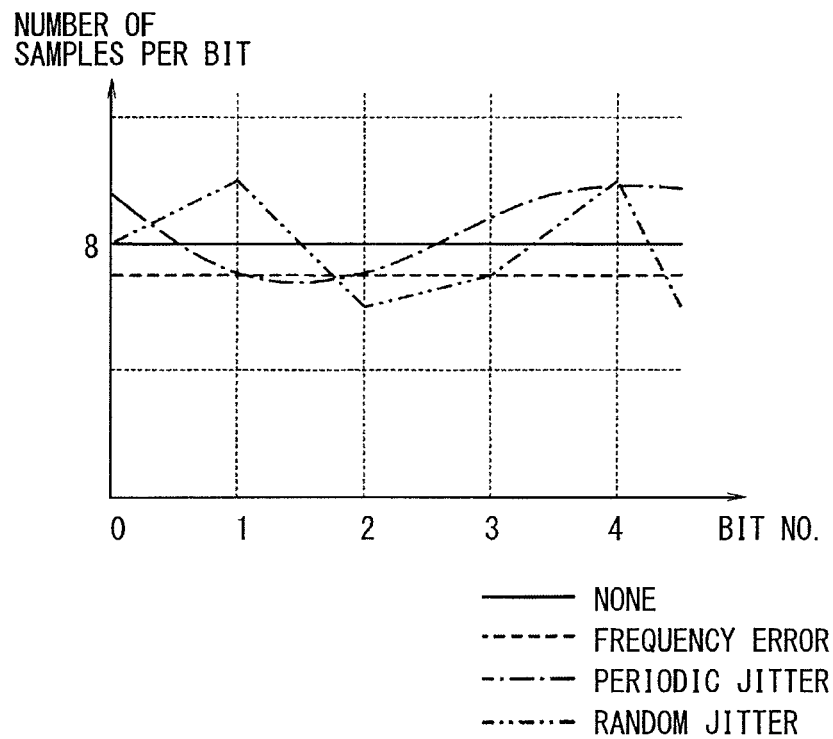
FIG. 3 is a diagram illustrating the number of samples per bit versus a degradation factor.
FIG. 4 is a diagram illustrating a bit number and the number of samples per bit.

Thus, the frequency error works as a degradation factor which causes a deviation between a 1-bit segment of the transmission side and a 1-bit segment of the reception side. Other than the frequency error, a periodic jitter or a random jitter may work as a degradation factor. FIG. 3 indicates examples of change in the number of samples per bit (also referred to as a per-bit sample count) depending on respective degradation factors. When no degradation factors occur, the number of samples per bit becomes constant at a normal number of samples per bit, as shown in "A", (eight samples per bit in FIG. 3, for example). In contrast, when a frequency error occurs as a degradation factor, the number of samples per bit becomes constantly deviated by a predetermined number of samples from the normal number of samples, as shown in "B", (six samples in FIG. 3, for example). Moreover, when a periodic jitter like a sine wave occurs as a degradation factor, the number of samples per bit becomes deviated in a sine waveform from the normal number of samples, as shown in "C". Further, when a random jitter occurs as a degradation factor, the number of samples per bit becomes deviated randomly from the normal number of samples, as shown in "D". Furthermore, when all the above-mentioned frequency error, the periodic jitter, and the random jitter occur as degradation factors (similar to a practical state) to influence on average, the number of samples per bit becomes averaged as shown in "E". In truth, the number of samples per bit is discretized by oversampling; thereby, the number of samples per bit becomes discretized as shown in "F". FIG. 4 indicates variations of the number of samples per bit when each degradation factor indicated in FIG. 3 occurs. It is noted that numerical values indicated in FIG. 4 differ from those in FIG. 3.

Suppose that a received bit string received from the data transmission apparatus 2 provides a known normally arranged pattern that bit-by-bit alternates "0" and "1" such as "0", "1", "0", "1". In such a case, even when the above-mentioned degradation factor occurs, the data reproduction circuit 8 can reproduce or determine data (i.e., a value or polarity of each bit). However, in fact, a received bit string received from the data transmission apparatus 2 provides an abnormally or irregularly arranged pattern of "0" and "1". Therefore, the data reproduction circuit 8 cannot reproduce the data for the following reasons when the above-mentioned degradation factor occurs.

Figure 5A:
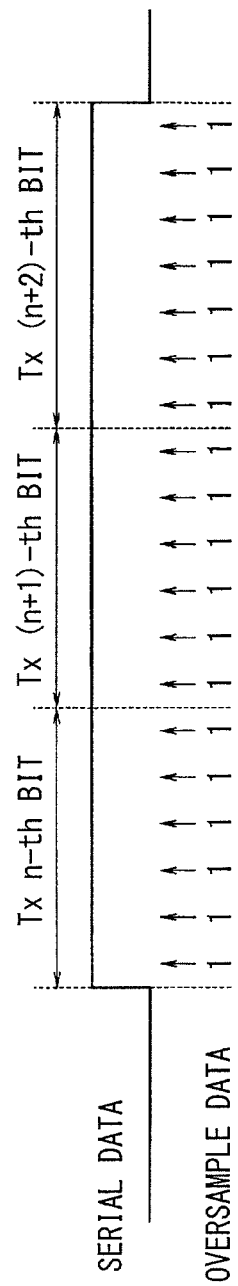
FIGS. 5A and 5B are diagrams illustrating other examples of oversampling data.
Figure 5B:
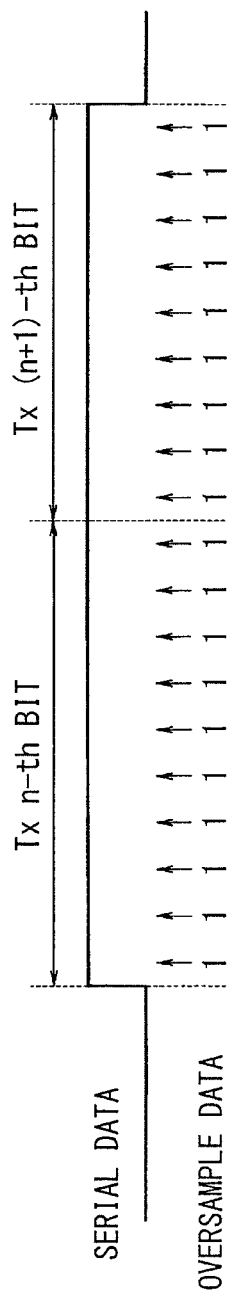

With reference to FIG. 3, when the periodic jitter or random jitter occurs, the number of samples per bit is changed from six to ten. When oversampling data having several identical values continue within a segment, the data reproduction circuit 8 becomes disabled to determine a bit length of the received bit string within the segment (how many bits the segment corresponds to), and thus disabled to reproduce the data. To be specific, suppose a case that 19 samples having identical values of "1" continue in the oversampling data, for example. Such a case may cause two possibilities. The first possibility is as illustrated in FIG. 5A, in which a random jitter causes 18 samples to seem to be 19 samples; 18 samples originally consist of three continuous bits of which each bit has six samples (18=3×6). The second possibility is as illustrated in FIG. 5B, in which a random jitter causes 20 samples to seem to be 19 samples; 20 samples originally consist of two continuous bits of which each bit has ten samples (20=2×10). Under the above possibilities being supposed, the data reproduction circuit 8 may try to determine a bit length of a bit string (with a conventional technique) using the oversampling data as it is inputted from the deserializer 7. In this case, the data reproduction circuit 8 cannot determine whether the oversampling data consisting of 19 samples correspond to a bit string of two bits or a bit string of three bits; thereby, the data cannot be reproduced.

To that end, in the present embodiment, the data reproduction circuit 8 performs second to fifth steps as follows. The bit integrated number calculation section 10 conducts a second step of calculating an integrated number of bits (also referred to as a bit integrated count) by integrating the number of bits of a received bit string received from the data transmission apparatus 2. The sample integrated number calculation section 11 conducts a third step of calculating an integrated number of samples (also referred to as a sample integrated count) by integrating the number of samples that the deserializer 7 obtains by oversampling each of the bits of the received bit string. The bit length determination section 12 conducts a fourth step of obtaining a fitting line (approximated line) based on a plurality of points each of which indicates correspondence between the integrated number of bits and the integrated number of samples. The bit length determination section 12 conducts a fifth step of determining an identical-value bit length of the received bit string corresponding to a segment in which identical values continue after the integrated number of samples in the oversampling data. In other words, the identical-value bit length is a bit length of which each bit has an identical value.

To be specific, the data reproduction circuit 8 plots associations or correspondence between the integrated number of bits and the integrated number of samples at each of change points (rise edges or fall edges) of bits, and obtains a fitting line. A slope of the fitting line signifies how many samples a single bit corresponds to (i.e., equivalent to "the number of samples per bit", "a sample count per bit", or "a per-bit sample count"). For instance, when one bit is oversampled with eight samples, the accuracy of positions which are obtained by oversampling a bit is only one eighth (⅛) that is the sampling period being inverse of the number of samples per bit. In contrast, acquisition of the fitting line using a plurality of bits (i.e., fitting of a plurality of bits) can provide an advantageous effect to permit the determination of the number of samples per bit with an accuracy higher than one eighth of the sampling period that is inverse of the number of samples per bit.

The data reproduction circuit 8 obtains a fitting line with a straight line approximation using both end points of a plurality of points according to the following Expressions (1) to (3). It is noted that an integrated number of bits is defined as "xn", an integrated number of samples is defined as "yn", and n points are defined as (x1, y1), (x2, y2), (xn, yn), wherein "n" is a natural number.

[Expressions (1) to (3)]

$$y = ax + b \tag{1}$$

$$a = \frac{yn - y1}{xn - x1} \tag{2}$$

$$b = \frac{xn y1 - x1 yn}{xn - x1} \tag{3}$$

Further, the data reproduction circuit 8 obtains a fitting line with a least square approximation using a plurality of points as parameters according to the following Expressions (4) to (6).

[Expressions (4) to (6)]

$$y = ax + b \tag{4}$$

$$a = \frac{n \sum_{i=1}^{n} x_i y_i - \sum_{i=1}^{n} x_i \sum_{i=1}^{n} y_i}{n \sum_{i=1}^{n} x_i^2 - \left(\sum_{i=1}^{n} x_i\right)^2} \tag{5}$$

$$b = \frac{\sum_{i=1}^{n} x_i^2 \sum_{i=1}^{n} y_i - \sum_{i=1}^{n} x_i y_i \sum_{i=1}^{n} x_i}{n \sum_{i=1}^{n} x_i^2 - \left(\sum_{i=1}^{n} x_i\right)^2} \tag{6}$$

Figure 6:
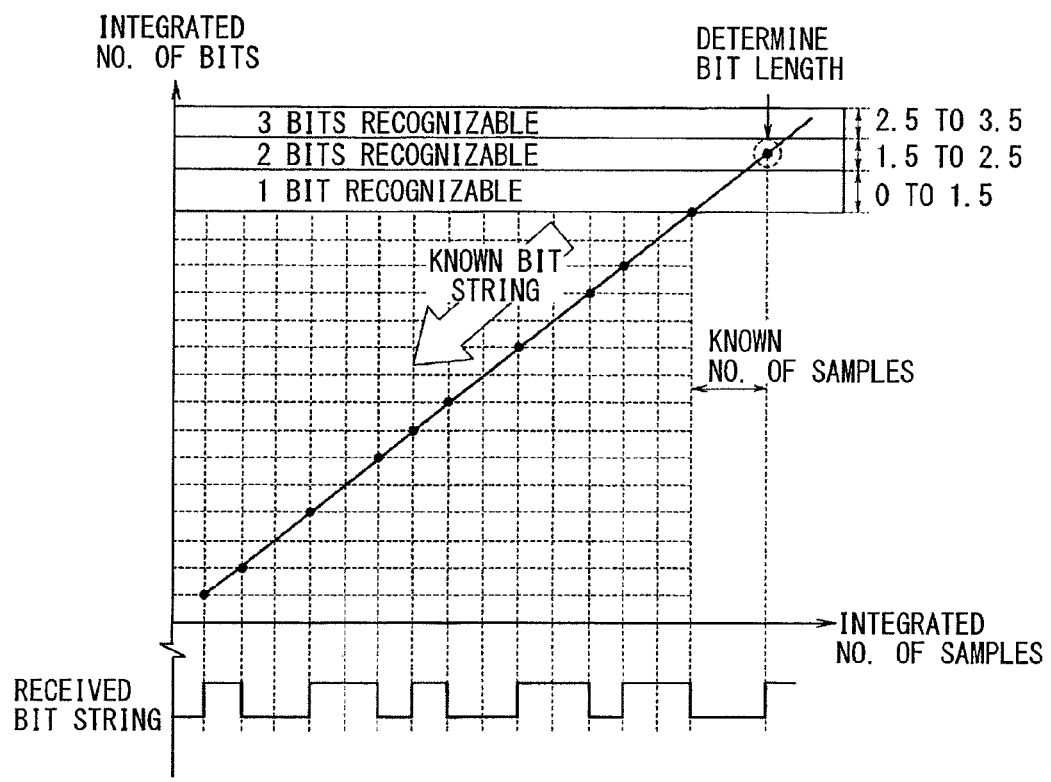
FIG. 6 is a diagram illustrating a first example of a fitting line.

The data reproduction circuit 8 then (i) obtains a known number of samples that is the number of samples in a segment in which identical values continue after the fitting line is obtained; and (ii) obtains an integrated number of samples corresponding to the known number of samples based on the fitting line. This permits the determination of a bit length of a bit string in the segment and the reproduction of the data. FIG. 6 illustrates an example where the data reproduction circuit 8 obtains a fitting line with a straight line approximation using the point of the rise edge of the first bit and the point of the fall edge of the 14th bit of the received bit string. In FIG. 6, the vertical axis indicates the integrated number of bits; the horizontal axis indicates the integrated number of samples. Further, a target segment for obtaining a fitting line may be a known bit pattern or bit string such as a preamble at start of data communication; this will be explained later.

Figure 7:
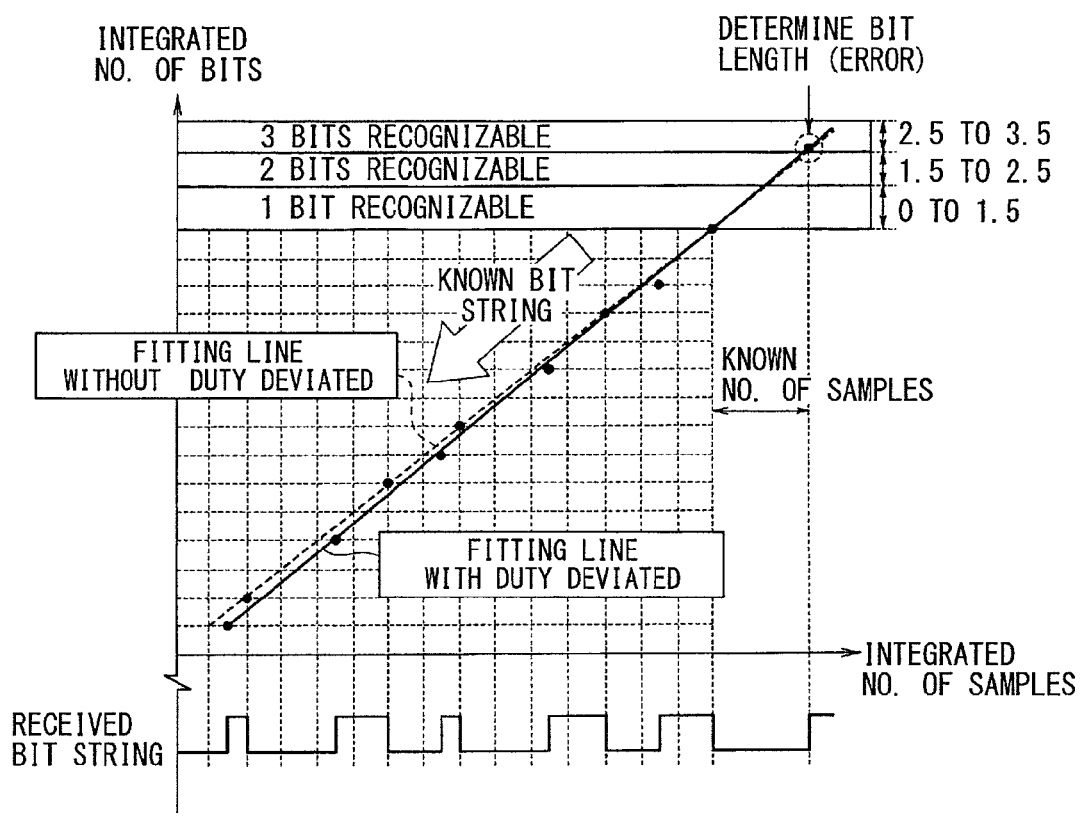
FIG. 7 is a diagram illustrating a second example of a fitting line.

Now, when a duty cycle does not deviate in each bit of a received bit string, the data reproduction circuit 8 can determine a bit length of a bit string corresponding to the known number of samples accurately. In contrast, when a duty cycle deviates in each bit of a received bit string, the data reproduction circuit 8 cannot easily determine a bit length of a bit string corresponding to the known number of samples accurately. With reference to FIG. 7, a fitting line is obtained by the data reproduction circuit 8 with a straight line approximation using the point of the rise edge of the first bit and the point of the fall edge of the 14th bit of the received bit string. In this case, the slope of the fitting line differs depending on whether or not a duty cycle deviates in each bit of the received bit string. As a result, in FIG. 7, when a duty cycle does not deviate, the bit length of the bit string corresponding to the known number of samples should be determined to be two bits. However, since a duty cycle deviates, the bit length is determined erroneously to be three bits.

Figure 8:
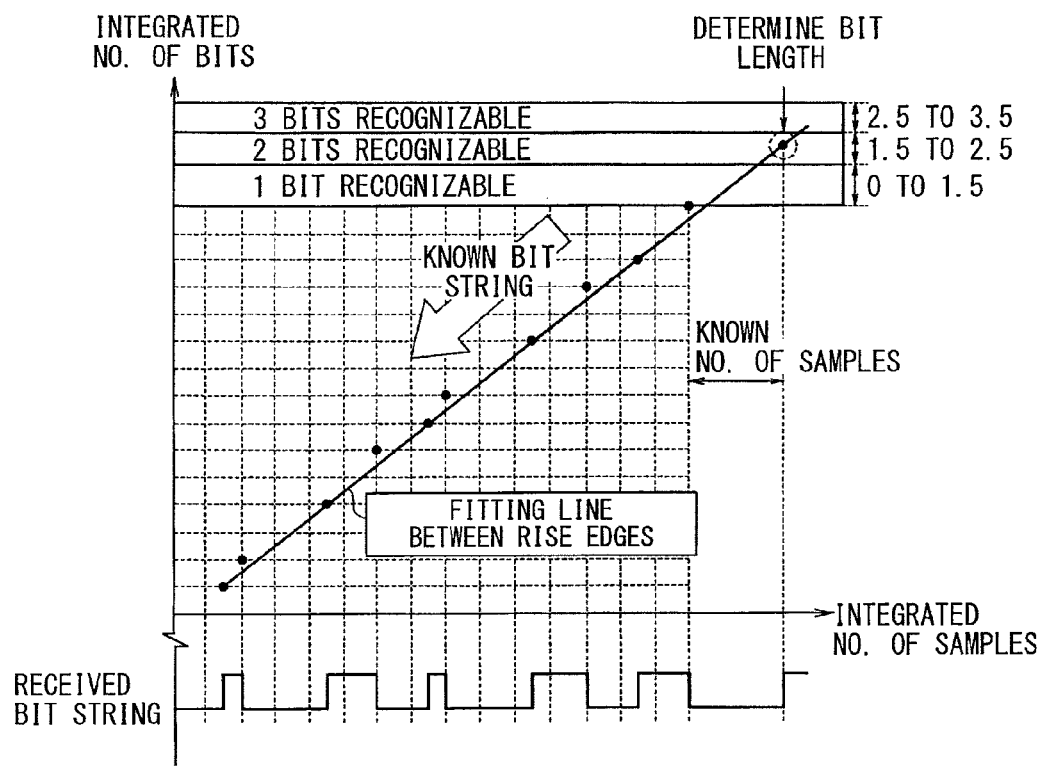
FIG. 8 is a diagram illustrating a third example of a fitting line.

To that end, the present embodiment provides a method as follows. The data reproduction circuit 8 obtains a fitting line between rise edges (i.e., approximated line between rise edges), which is defined as a fitting line with a straight line approximation using the points corresponding to only rise edges of bits of the received bit string. With reference to FIG. 8, a fitting line is obtained by the data reproduction circuit 8 with a straight line approximation using the point corresponding to the rise edge of the first bit and the point corresponding to the rise edge of the 13th bit of the received bit string. Similarly, the data reproduction circuit 8 may obtain a fitting line between fall edges (i.e., approximated line between fall edges), which is defined as a fitting line with a straight line approximation using the points corresponding to only fall edges of bits of the received bit string.

The above method according to the present embodiment pays attention to the point that the deviation in a duty cycle of each bit of a received bit string arises evenly in each bit. In other words, it is general that a duty cycle deviation arises such that the amount of deviation of a rise edge or a fall edge is constant; this signifies that the duty cycle deviation does not change or affect the time period between rise edges or the time period between fall edges. Further, this also signifies that the duty cycle deviation does not change or affect the number of bits between rise edges or the number of bits between fall edges. Thus, a fitting line is obtained only based on the points of either rise edges or fall edges of bits of the received bit string. This helps prevent an erroneous determination due to the deviation in the duty cycle.

Figure 9:
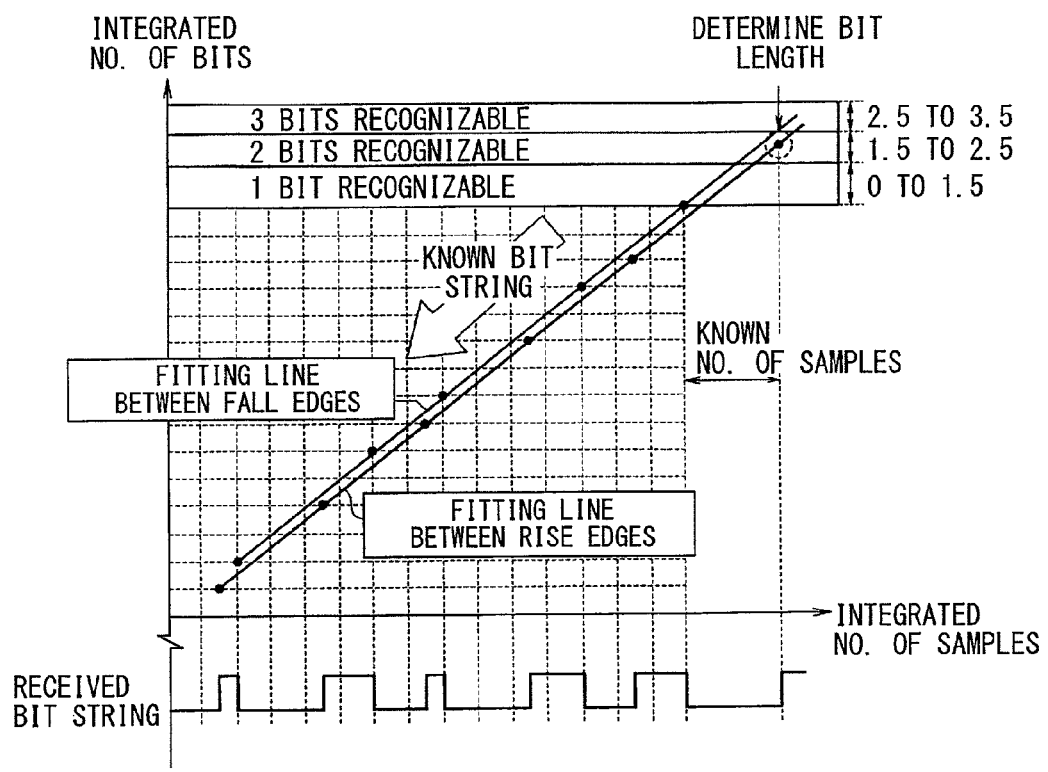
FIG. 9 is a diagram illustrating a fourth example of a fitting line.

Moreover, as indicated in FIG. 9, the data reproduction circuit 8 may use the fitting line between rise edges and the fitting line between fall edges. Alternately using of the fitting line between rise edges and the fitting line between fall edges enables the speed of a series of processing up to the data production to increase. That is, a method of reproducing data by obtaining a fitting line takes time generally. For instance, a conventional method is to obtain a fitting line based on both the fall edges and the rise edges (i.e., without distinguishing between an rise edge and a fall edge); this method needs the last information that is the information of the last identical-value bit string having at least one identical value immediately previous to a target identical-value bit string that is a bit string serving as a target for the data reproduction; the needed information of the last identical-value bit string is both the number of samples and the number of bits. It is noted that an identical-value bit string may be defined as a string of at least one bit between a starting edge and an ending edge that is immediately neighboring the starting edge; the starting edge is one of a rise edge and a fall edge whereas the ending edge is the other of the rise edge and the fall edge. A comparative example in FIG. 10A illustrates a case where the speed of a series of processing is limited by the processing of calculating a fitting line. In contrast, the method according to the present embodiment can use the second last information (previous by two) that is the information of the second last identical-value bit string so as to prepare a fitting line without need of all the last information of the last identical-value bit string. With reference to FIG. 10B, a series of processing can be treated as pipeline processing to increase the speed of the series of processing and the speed of reproducing the data as compared with the comparative method in FIG. 10A.

Figure 11:
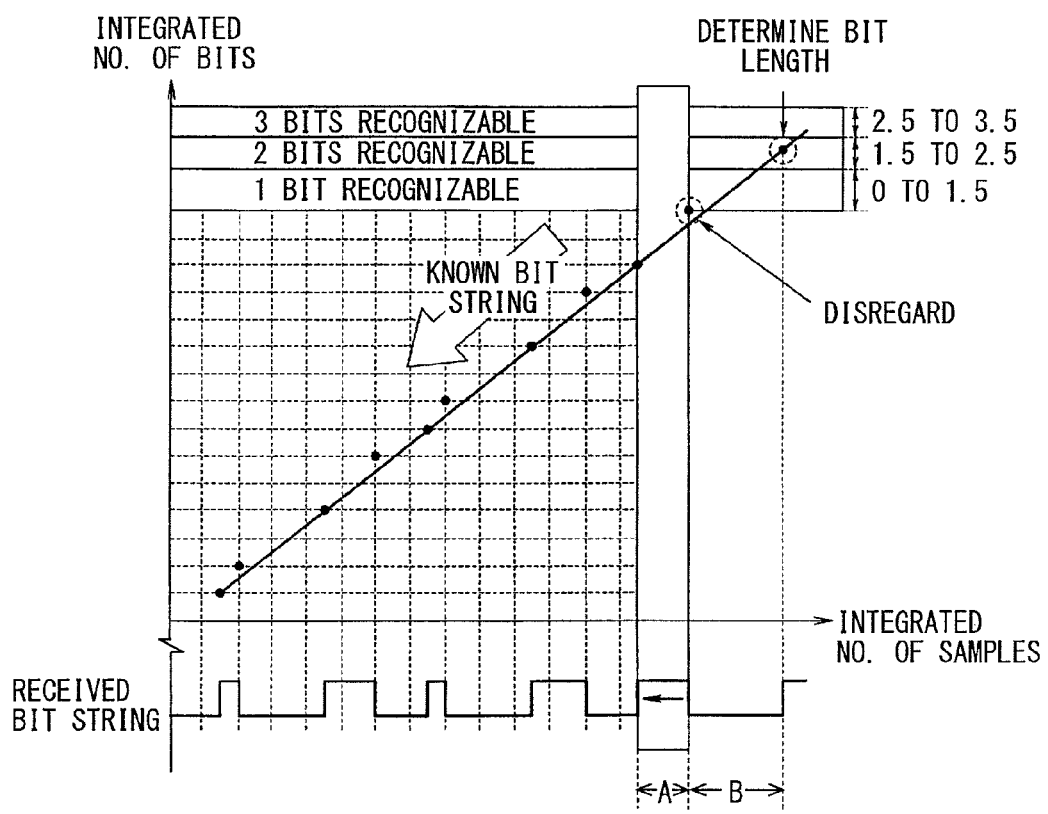
FIG. 11 is a diagram illustrating a fifth example of a fitting line.
Figure 12:
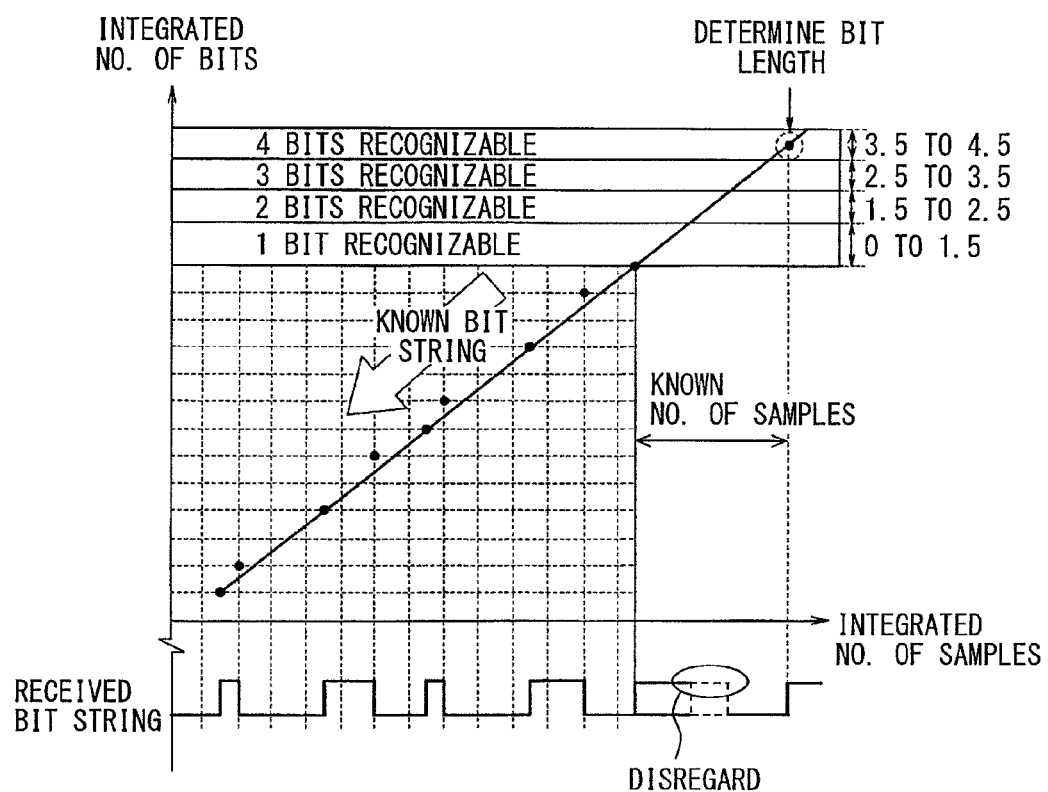
FIG. 12 is a diagram illustrating a sixth example of a fitting line.
Figure 13:
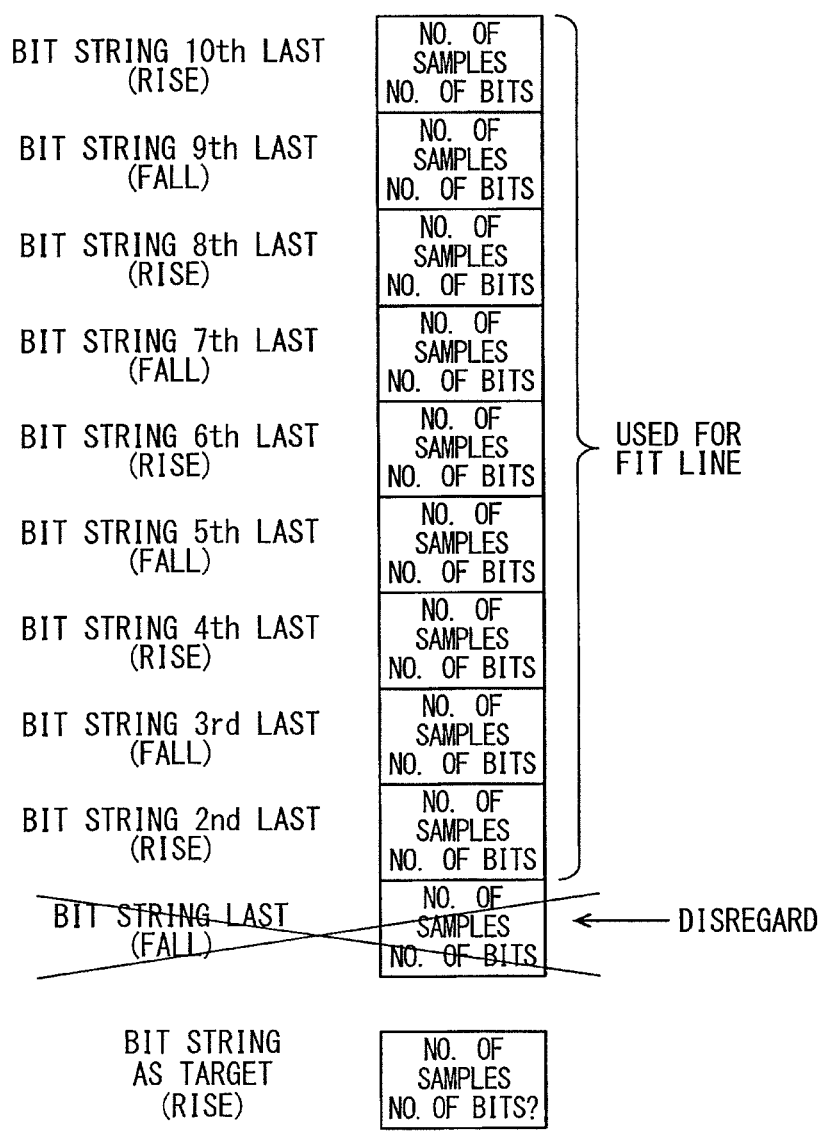
FIG. 13 is a diagram illustrating a fitting range.

Further, in the present embodiment, an ending edge of the last identical-value bit string does not need to be detected for preparing a fitting line. As explained above, a target bit string is a bit string serving as a target for the data reproduction, whereas the last identical-value bit string is immediately before the target bit string. Thus, the ending edge of the last identical-value bit string is different from or opposite to the ending edge of the target bit string. With reference to FIG. 11, as indicated with "DISREGARD", the ending edge of the last identical-value bit string "A" can be disregarded. It is noted that while the number of bits of the last identical-value bit string "A" may be already known since the last identical-value bit string "A" is included in the known bit pattern or bit string, the known number of samples that is increased by "←" in FIG. 11 is also counted or detected. FIG. 12 indicates another example to be able to disregard the ending edge of the last identical-value bit string. That is, even if the ending edge (i.e., the fall edge may be switched between the dotted lines indicating fall edges), the fitting line can be calculated.

Moreover, the method according to the present embodiment, within a fitting range of received bit string for preparing a fitting line, the earliest identical-value bit string is designated to have the edges of the starting edge and the ending edge identical to those of a target bit string that is a bit string serving as a target of data reproduction. That is, the total of the fitting range including the target bit string is designated to be an even number. This eliminates need of an exceptional circuit and helps prevent erroneous determination due to the deviation of duty cycles. For instance, with reference to FIG. 13, the data reproduction circuit 8 disregards the last identical-value bit string that is immediately before the target bit string, to designate the fitting range to contain nine identical-value bit strings; thereby, the fitting line can be obtained under the condition that the 10th last identical-value bit string has an edge identical to an edge of the target bit string.

Figure 14:
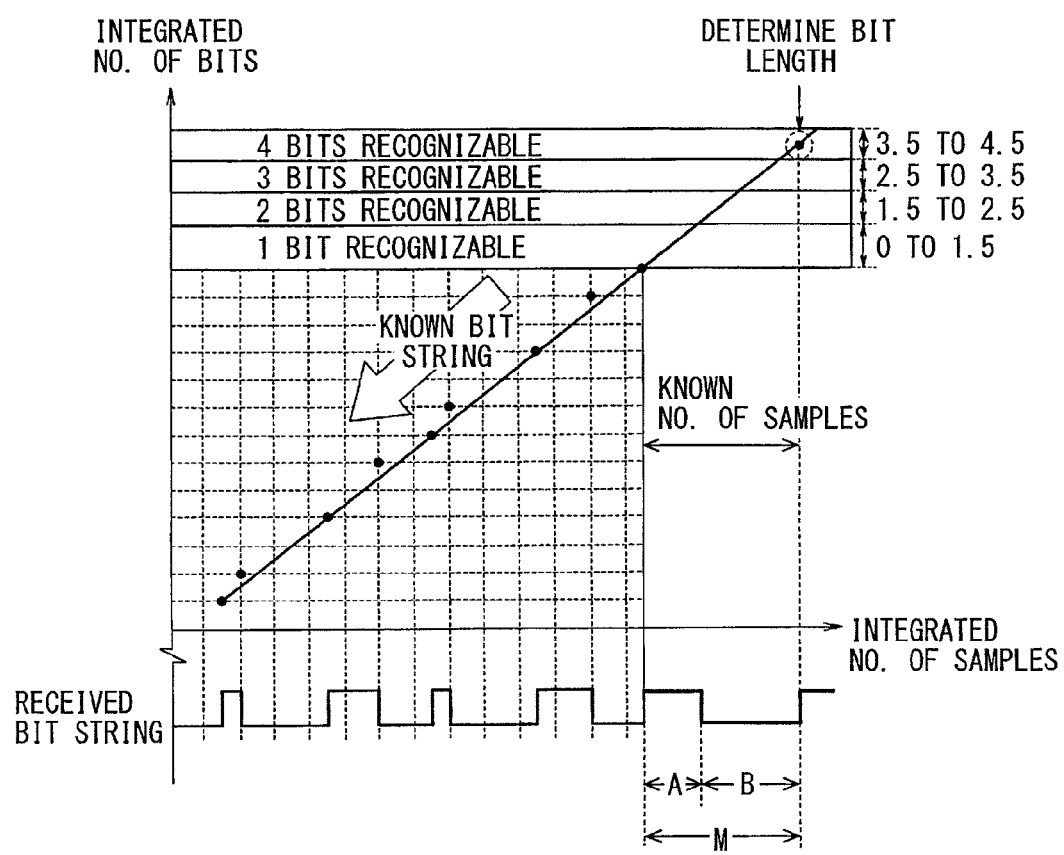
FIG. 14 is a diagram illustrating a seventh example of a fitting line.

With reference to FIG. 14 and FIG. 15, a specific process of the present embodiment will be explained as an example; the specific process is to determine a bit length, which is referred to as an identical-value bit length, in an unknown target segment or target identical-value bit string "B" in which identical values of samples continue after the integrated number of samples.

With reference to FIG. 14, the fitting line may be obtained based on a first known bit pattern or bit string such as (i) a preamble or (ii) an already-defined start-of-frame pattern known as a comma pattern for the Byte alignment. In this case, an identical-value bit string "A" is the last identical-value bit string included in the first known bit pattern. Thus, the number of bits in the identical-value bit string "A" is already known to be "2 bits", for instance, whereas the number of bits of a target identical-value bit string "B" is unknown. A combined bit string "M" is defined as a combination or combined segment of the identical-value bit string "A" and the target identical-value bit string "B". Herein, "the number of bits" may be also referred to as "a bit count".

FIG. 15 illustrates the following steps.

(1) Step 1

After the fitting line is obtained based on only the rise edges of the first known bit pattern that excludes the last identical-value bit string "A" as explained above, the number of bits included in the combined bit string "M" is to be found based on (i) the obtained fitting line and (ii) the integrated number of samples starting from the starting edge of the combined bit string "M" (i.e., the starting edge of the identical-value bit string "A").

(2) Step 2

The number of bits of "M" is thus found to be "4 bits", for instance. The number of bits of the identical-value bit string "B" is then calculated by subtracting the number of bits of "A" from the number of bits of "M", i.e., "2 (=4−2) bits", for instance.

(3) Step 3

Now, a next target identical-value bit string "C" arises after the already known identical-value bit string "B". A combined bit string "N" is defined as a combination or combined segment of the known identical-value bit string "B" and the unknown identical-value bit string "C". After the fitting line is obtained based on only the fall edges (instead of the rise edges) of a second known bit pattern, which is the first known bit pattern that includes the identical-value bit pattern "A", the number of bits included in the combined bit string "N" is to be found based on the obtained fitting line and the integrated number of samples starting from the starting edge of the combined bit string "N" (i.e., the starting edge of the identical-value bit string "B").

(4) Step 4

The number of bits of "N" is thus found to be "5 bits", for instance. The number of bits of the identical-value bit string "C" is then calculated by subtracting the number of bits of "B" from the number of bits of "N", i.e., "3 (=5−2) bits", for instance.

Following Step 4, another next target identical-value bit string "D" may arise after the bit string "C". In this case, the calculation similar to the above Steps 1 and 2 based on the rise edges may be made. Further, another next target identical-value bit string "E" may arise after the bit string "D". In this case, the calculation similar to the above Steps 3 and 4 based on the fall edges may be made. In other words, Steps 1 and 2 and Steps 3 and 4 can be applied to newly arising unknown identical-value bit strings recursively; this enables a continuous determination or adjustment of bit lengths along with reproducing data even if a clock frequency varies with an elapse of time.

As explained above, it is general that a duty cycle deviation arises such that the amount of deviation of a rise edge or a fall edge is constant; this signifies, in particular, that the duty cycle deviation does not change or affect the time period between immediately adjacent rise edges or the time period between immediately adjacent fall edges. Further, in particular, this also signifies that the duty cycle deviation does not change or affect the number of bits between immediately adjacent rise edges or the number of bits between immediately adjacent fall edges. This provides an effective recursive calculation of determining a bit length in an unknown bit sting that arises repeatedly based on fitting lines alternately using either the rise edges or the fall edges like in Steps 1 to 4 mentioned above. This enables an accurate determination of a bit length as an identical-value bit length in a received bit string even when a duty cycle may deviate in each bit of the received bit string.

Furthermore, although above Step 1 explains an example to obtain the number of bits of "M" using the fitting line based on only the rise edges, it may be also obtained based on a combination of the fitting line based on the rise edges and the fitting line based on the fall edges. Similarly, although above Step 3 explains an example to obtain the number of bits of "N" using the fitting line based on only the fall edges, it may be also obtained based on a combination of the fitting line based on the rise edges and the fitting line based on the fall edges.

Further, it is noted that although an accuracy of determining a bit length is increased when the deviation of the duty cycle is constant or identical with an elapse of time, the deviation need not to be constant or identical with an elapse of time. This case may however decrease an accuracy of determining a bit length. Even in this case, however, the fitting line is updated and compensates the deviation in a duty cycle that varies with an elapse of time. Therefore, the degradation of the determination ability can be suppressed.

Figure 16:
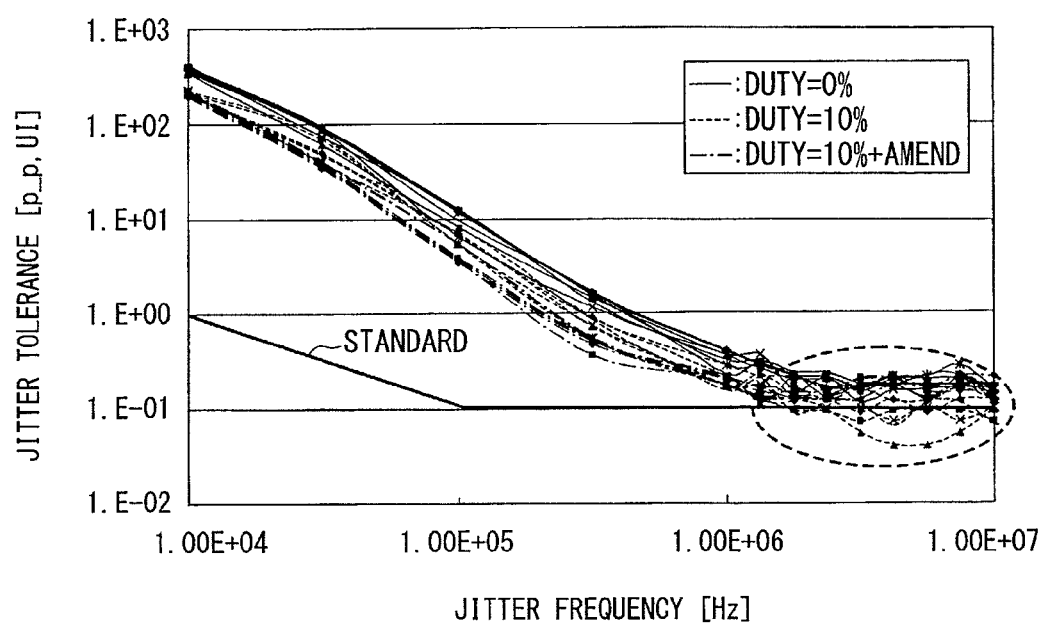
FIG. 16 is a diagram illustrating a simulation of jitter tolerance.

FIG. 16 illustrates a simulation of jitter tolerance. When the deviation of a duty cycle of each bit in a received bit string is 10% of one bit length ("duty=10%"), the tolerance values to high frequency jitters exceed a standard line; this proves that an accuracy for reproducing data is worse. In contrast, according to the present embodiment ("duty=10%+amend"), the tolerance values to high frequency jitters do not exceed the standard line. This helps prevent (i) the influence of the deviation of duty cycle of each bit in a received bit string and (ii) the decrease of the accuracy for reproducing data.

The data reproduction circuit 8 may use a preamble as a target segment for obtaining a fitting line in a series of processing at the start of the data communication. The segment of a preamble provides a known normal bit pattern (or bit string) of about ten bits such as "0", "1", "0", "1", . . . . Further, after first obtaining a fitting line from the segment of a preamble at the start of data communications, the data reproduction circuit 8 then may determine an identical-value bit length of a bit string following the preamble. In contrast, for example, the periodic jitter like a sine wave varies the number of samples with time. In consideration of such periodic jitter, the fitting line may be suitably updated continuously in order to meet the variation of the number of samples. That is, the data reproduction circuit 8 obtains (updates) a new fitting line using a segment of data whose bit values are known, other than the segment of a preamble, and then determines an identical-value bit length of a bit string using the new fitting line.

Moreover, the data reproduction circuit 8 may change the number of points which are used for obtaining a fitting line. For instance, there may be a case where when data communications resume from the interrupted state, a few earlier bits (e.g., one bit) of a bit string of a preamble may be missing before the operation (receive clock) of the data reception apparatus 3 becomes stable. For such a case, the data reproduction circuit 8 may obtain a fitting line by using subject points excluding a predetermined number of bits (e.g., earlier one bit). Under such a configuration, even when a few earlier bits of a bit string of a preamble are missing, the influence can be eliminated; the data communications can be maintained stable.

Moreover, the data reproduction circuit 8 may increase the number of points which are used for obtaining a fitting line as the data communications proceed. That is, at the time of start of data communications, the data reproduction circuit 8 obtains a fitting line using ten points or the like corresponding to a bit string of a preamble. As data communications proceed, in consideration of noise resistance of a communication line which transmits data, the data reproduction circuit 8 obtains a fitting line using ten or more points corresponding to a bit string of data. Moreover, when the number of points used for obtaining a fitting line is increased infinitely, the magnitude or size of the circuit may be increased undesirably. To that end, the data reproduction circuit 8 may stop increasing the number of points to maintain less than 100 (i.e., less than a threshold bit number in a bit string), and then maintain the number of points to be constant. This configuration can prevent an unsuitable increase in the magnitude of the circuit. Furthermore, the data reproduction circuit 8 may obtain a fitting line using only points near a subject bit string serving as a target of data reproduction, then determining a bit length using the obtained fitting line. This configuration permits the determination of a bit length after reflecting a degradation factor arising closely as much as possible.

As explained above, according to the present embodiment, the data reception apparatus 3 calculates an integrated number of bits by integrating the number of bits in a received bit string; calculates an integrated number of samples by integrating the number of samples obtained by oversampling each bit; and obtains a fitting line indicating correspondence between the integrated number of bits and the integrated number of samples. The data reception apparatus 3 then determines an identical-value bit length corresponding to a segment in which identical values continue after the integrated number of samples based on the fitting line. Such a configuration permits the determination of an identical-value bit length corresponding to the segment even when the receive-side clock source 6 has a degree of clock frequency error compared with a transmit-side clock source 4. In this case, a fitting line or an approximated line is obtained based on a plurality of points of which each point corresponds to either only a rise edge or only a fall edge of each bit in the received bit string. This enables an accurate determination of an identical-value bit length in a received bit string even when a duty cycle may deviate in each bit of the received bit string.

Further, the data is reproduced by obtaining simultaneously both the fitting line between rise edges and the fitting line between fall edges. This enables the speed of a series of processing up to the data production to increase. Further, the fitting line may be obtained with a straight line interpolation or approximation that has, as a parameter, each of both end points within the plurality of points or with a least square approximation that has, as a parameter, each of a plurality of points. Thereby, a fitting line can be obtained with a simple computation.

(Other Embodiments)

The present disclosure is not limited only to the above-mentioned embodiment, and can be modified or extended as follows. The modifications may be further combined in various manners. The above embodiment explains an example configuration where data communications are applied to those between LSIs. Without need to be limited thereto, the present disclosure may be applied to the data communications for uses unrelated to an ECU mounted in a vehicle. Although a configuration is explained above where a single data transmission apparatus and a single data reception apparatus are connected with each other, namely, as one to one connection, a data transmission apparatus and data reception apparatuses may be connected as one to several. In this case, several data reception apparatuses may be mounted in a single LSI, or in respective different LSIs. Further, when each of several data reception apparatuses has an independent receive-side clock source, a clock frequency error or difference from a transmit-side clock source arises independently (individually). In this case, each data reception apparatus eventually obtains an approximated line independently to reproduce data suitably. That is, even when a plurality of data reception apparatuses are provided, each apparatus obtains an approximated line independently; this can cancel the influence due to a clock frequency error of each apparatus. Moreover, suppose that an additional data reception apparatus may be added in a data communication system, for example. Even in such a case, without considering a frequency error of a receive clock of a receive-side clock source in another data reception apparatus, a frequency of the receive clock of the receive-side clock source of the additional data reception apparatus can be selected. This can reduce the restriction at the time of extending the data communication system.

Although the configuration is explained above in which the data communications transmit data in one direction from a data transmission apparatus to a data reception apparatus. The data communications may conduct reciprocal transmission between data transmission/reception (transceiver) apparatuses that have functions of data transmission and data reception. In that case, a transmit-side clock source and a receive-side clock source may be provided in common in the data transceiver apparatus. Moreover, the data communication may conduct full-duplex communications or half-duplex communications.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A data reception apparatus comprising:
a receive-side clock source separate from a transmit-side clock source of a data transmission apparatus that transmits data, the receive-side clock source generating a receive clock;
a deserializer that generates oversampling data by oversampling each bit of a received bit string, which is received from the data transmission apparatus, in synchronization with the receive clock generated from the receive-side clock source; and
a data reproduction circuit, which includes:
a bit integrated number calculation section that calculates an integrated number of bits by integrating a predetermined number of bits in the received bit string;
a sample integrated number calculation section that calculates an integrated number of samples by integrating the number of samples corresponding to each bit of the integrated predetermined number of bits in the oversampling data generated by the oversampling data generation device; and
a bit length determination section that
obtains an approximated line based on a plurality of points each of which indicates correspondence between the integrated number of bits and the integrated number of samples, and
determines an identical-value bit length in the oversampling data based on the approximated line, the identical-value bit length being a bit length in an identical-value bit string corresponding to a segment in which identical values continue after the integrated number of samples calculated by the sample integrated number calculation section,
wherein the bit length determination section obtains the approximated line based on the plurality of points each of which corresponds to at least either only a rise edge of each bit or only a fall edge of each bit in the received bit string.

2. The data reception apparatus according to claim 1, wherein the bit length determination section obtains the approximated line with a straight line interpolation that has, as a parameter, each of a start point and an end point within the plurality of points.

3. The data reception apparatus according to claim 1, wherein the bit length determination section obtains the approximated line with a least square approximation that has, as a parameter, each of the plurality of points.

4. The data reception apparatus according to claim 1, wherein:
the approximated line is obtained as a first approximated line using only a plurality of first edges, each of the plurality of first edges being one of (i) the rise edge and (ii) the fall edge;
the identical-value bit length is determined based on a first specified number of bits in the segment in which the identical values continue after the integrated number of samples; and
the first specified number of bits is obtained by subtracting a known number of bits from an obtained number of bits that is obtained based on the first approximate line.

5. The data reception apparatus according to claim 4, wherein:
the bit length determination section further obtains a second approximated line following obtaining the first approximated line, the second approximated line being obtained using only a plurality of second edges, each of the plurality of second edges being the other of (i) the rise edge and (ii) the fall edge, to determine a next identical-value bit length in the oversampling data, the next identical-value bit length being a next bit length in a next segment in which identical values continue after the integrated number of samples;
the next identical-value bit length is determined based on a second specified number of bits in the next segment; and
the second specified number of bits is obtained by subtracting, as a next known number of bits, the already obtained first specified number of bits from a next obtained number of bits that is obtained based on the second approximate line.

6. The data reception apparatus according to claim 5, wherein:
the known number of bits that is used for obtaining the first specified number of bits is known as a part of (i) a preamble or (ii) an already-defined start-of-frame pattern included in the received bit string.

7. The data reception apparatus according to claim 1, wherein
the data reproduction circuit further includes a data reproduction section that reproduces data from the identical-value bit length in the received bit string that is determined based on the approximated line.

8. A data reception apparatus
comprising:
a receive-side clock source separate from a transmit-side clock source of a data transmission apparatus that transmits data, the receive-side clock source generating a receive clock;
a deserializer that generates oversampling data by oversampling each bit of a received bit string, which is received from the data transmission apparatus, in synchronization with the receive clock generated from the receive-side clock source; and a data reproduction circuit, which includes:
a bit integrated number calculation section that calculates an integrated number of bits by integrating a predetermined number of bits in the received bit string;
a sample integrated number calculation section that calculates an integrated number of samples by integrating the number of samples corresponding to each bit of the integrated predetermined number of bits in the oversampling data generated by the oversampling data generation device; and
a bit length determination section that
obtains an approximated line based on a plurality of points each of which indicates correspondence between the integrated number of bits and the integrated number of samples, and
determines an identical-value bit length in the oversampling data based on the approximated line, the identical-value bit length being a bit length in an identical-value bit string corresponding to a segment in which identical values continue after the integrated number of samples calculated by the sample integrated number calculation section,
wherein the bit length determination section obtains the approximated line by obtaining an approximated line between rise edges based on the plurality of points each of which corresponds to only a rise edge of each bit in the received bit string, and by simultaneously obtaining an approximated line between fall edges based on the plurality of points each of which corresponds to only a fall edge of each bit in the received bit string.

9. The data reception apparatus according to claim 8, the data reproduction circuit further including
a data reproduction section that reproduces data from the identical-value bit length in the received bit string that is determined based on both the approximated line between the rise edges and the approximated line between the fall edges.

10. The data reception apparatus according to claim 9, wherein:
the identical-value bit length is determined based on a first specified number of bits in the segment in which the identical values continue after the integrated number of samples;
the first specified number of bits is obtained by subtracting a known number of bits from an obtained number of bits that is obtained based on a first approximated line that is one of (i) the approximated line between the rise edges and (ii) the approximated line between the fall edges.

11. The data reception apparatus according to claim 10, wherein:
the bit length determination section further obtains a second approximated line following obtaining the first approximated line, the second approximated line being the other of (i) the approximated line between the rise edges and (ii) the approximated line between the fall edges, to determine a next identical-value bit length in the oversampling data, the next identical-value bit length being a next bit length in a next segment in which identical values continue after the integrated number of samples;
the next identical-value bit length is determined based on a second specified number of bits in the next segment; and
the second specified number of bits is obtained by subtracting, as a next known number of bits, the already obtained first specified number of bits from a next obtained number of bits that is obtained based on the second approximate line.

12. The data reception apparatus according to claim 11, wherein:
the known number of bits that is used for obtaining the first specified number of bits is known as a part of (i) a preamble or (ii) an already-defined start-of-frame pattern included in the received bit string.

13. The data reception apparatus according to claim 8, wherein the bit length determination section obtains the approximated line with a straight line interpolation that has, as a parameter, each of a start point and an end point within the plurality of points.

14. The data reception apparatus according to claim 8, wherein the bit length determination section obtains the approximated line with a least square approximation that has, as a parameter, each of the plurality of points.

15. A method of determining a bit length in a received bit string, the method being computer-implemented and executed by a computer, the method comprising:
a first step of generating oversampling data by oversampling each bit of a received bit string, which is received from a data transmission apparatus transmitting data, in synchronization with a receive clock inputted from a receive-side clock source being separate from a transmit-side clock source of the data transmission apparatus;
a second step of calculating an integrated number of bits by integrating a predetermined number of bits in the received bit string;
a third step of calculating an integrated number of samples by integrating the number of samples, which correspond to each bit of the predetermined number of bits integrated in the second step, in the oversampling data generated in the first step;
a fourth step of obtaining an approximated line based on a plurality of points each of which indicates correspondence between the integrated number of bits and the integrated number of samples; and
a fifth step of determining, as an identical-value bit length, a bit length in an identical-value bit string corresponding to a segment, where identical values continue after the integrated number of samples calculated in the third step, in the oversampling data generated in the first step based on the approximated line obtained in the fourth step,
wherein the fourth step obtains the approximated line based on a plurality of points each of which corresponds to at least either only a rise edge of each bit or only a fall edge of each bit in the received bit string.

16. A method for determining a bit length in a received bit string from a data transmission apparatus,
the received bit string including a plurality of first identical-value bit strings and a plurality of second identical-value bit strings, a first identical-value bit string and a second identical-value bit string arising alternately,
the first identical-value bit string having at least one first value of a bit without any second value of the bit, the second identical-value bit string having at least one second value of the bit without any first value of the bit,
each first identical-value bit string starting with a first edge serving as a starting edge and ending with a second edge serving as an ending edge, each second identical-value bit string starting with the second edge serving as a starting edge and ending with the first edge serving as an ending edge,
the first edge being one of a rise edge and a fall edge, the second edge being the other of the rise edge and the fall edge,
the method being computer-implemented and executed by a computer, the method comprising:
generating oversampling data by oversampling each bit of the received bit string from the transmission apparatus in synchronization with a receive clock inputted from a receive-side clock source being separate from a transmit-side clock source of the data transmission apparatus;
calculating an integrated number of bits by integrating bits in the received bit string;
calculating an integrated number of samples by integrating samples, which correspond to the bits that are integrated, in the oversampling data;
finding a combined segment of samples in the oversampling data, the combined segment corresponding to a combination of a former bit string being the first identical-value bit string and a latter bit string being the second identical-value bit string, wherein a specified number of bits of the former bit string is previously known;
obtaining an approximated line based on a plurality of points each of which corresponds to the first edge, the plurality of points indicate correspondence between the integrated number of bits and the integrated number of samples up to the first edge being the starting edge of the former bit of the combined segment;
determining, based on the approximated line, a total number of bits included in the combined segment and a bit length in the combined segment; and
determining a specified number of bits of the latter bit string by subtracting the previously known specified number of bits of the former bit string from the total number of bits of the combined segment.

17. The method according to claim 16, further comprising:
finding, after the combined segment, a next combined segment of samples in the oversampling data, the next combined segment corresponding to a combination of (i) a next former bit string being the second identical-value bit string being the latter bit string of the combined segment and (ii) a next latter bit string being the first identical-value bit string, wherein a next specified number of bits of the next former bit string is previously determined as the specified number of bits of the latter bit sting of the combined segment;
obtaining a next approximated line based on a plurality of points each of which corresponds to the second edge, the plurality of points indicate correspondence between the integrated number of bits and the integrated number of samples up to the second edge being the starting edge of the next former bit of the next combined segment;
determining, based on the next approximated line, a next total number of bits included in the next combined segment and a bit length in the next combined segment; and
determining a next specified number of bits of the next latter bit string by subtracting the previously determined specified number of bits of the latter bit string of the combined segment from the next total number of bits of the next combined segment.

18. The method according to claim 16, wherein:
the previously known specified number of bits of the former bit string of the combined segment is known as a part of (i) a preamble or (ii) an already-defined start-of-frame pattern included in the received bit string.

19. The method according to claim 16, wherein:
a bit pattern up to the ending edge of the former bit string of the combined segment for obtaining the approximated line is included in (i) a known preamble or (ii) an already-defined start-of-frame pattern in the received bit string.

\* \* \* \* \*